US008075004B2

(12) United States Patent
Abel et al.

(10) Patent No.: US 8,075,004 B2
(45) Date of Patent: Dec. 13, 2011

(54) VOTER TERMINAL STORAGE AND TRANSPORT CART

(75) Inventors: Gary V. Abel, Ellicott City, MD (US); Joseph Wilson, Spencer, WV (US)

(73) Assignees: C.R. Daniels, Inc., Ellicott City, MD (US); Casto & Harris, Inc., Spencer, WV (US)

( * ) Notice: Subject to any disclaimer, the term of this patent is extended or adjusted under 35 U.S.C. 154(b) by 227 days.

(21) Appl. No.: 12/380,738

(22) Filed: Mar. 3, 2009

(65) Prior Publication Data

US 2009/0166992 A1 Jul. 2, 2009

Related U.S. Application Data

(63) Continuation-in-part of application No. 11/899,333, filed on Sep. 5, 2007, now Pat. No. 7,654,457.

(51) Int. Cl.
*B62B 3/02* (2006.01)

(52) U.S. Cl. ............... 280/47.35; 280/47.34; 280/79.11; 280/79.3

(58) Field of Classification Search ............... 280/47.34, 280/47.35, 47.39, 79.11, 79.2; 312/294, 312/295, 309, 310, 311, 322, 323, 326, 327, 312/328, 329, 283, 285, 286, 287, 289, 290, 312/194, 195, 196, 249.1, 249.8
See application file for complete search history.

(56) References Cited

U.S. PATENT DOCUMENTS

| | | | | |
|---|---|---|---|---|
| 2,357,555 | A * | 9/1944 | Seaton | 312/209 |
| 2,778,704 | A * | 1/1957 | Joachim | 312/309 |
| 4,253,715 | A * | 3/1981 | Greiner | 312/21 |
| 4,451,728 | A * | 5/1984 | McKay et al. | 235/50 R |
| 2003/0218307 | A1* | 11/2003 | Anderson et al. | 280/79.2 |
| 2006/0055135 | A1* | 3/2006 | Tracewell et al. | 280/47.35 |

* cited by examiner

*Primary Examiner* — J. Allen Shriver, II
*Assistant Examiner* — Bryan Evans
(74) *Attorney, Agent, or Firm* — Ober, Kaler, Grimes & Shriver; Royal W. Craig

(57) ABSTRACT

A voter cart capable of supporting a voting terminal in a portable, fully usable, and secure configuration. The cart is generally formed with a pair of opposing side rails joined together in a spaced-apart configuration and mounted on casters, and a voting terminal housing interspaced between the side rails. The voting terminal is seated atop a bottom shelf of the voting terminal housing at waist-level for easy wheelchair voter access thereto. The voting terminal is restrained against lateral and vertical motion, and yet there is full access to the voting terminal's control panels, doors, etc. Moreover, the particular design maximizes strength and usability, and yet keeps weight to a minimum with a framework that is as light weight as possible.

17 Claims, 7 Drawing Sheets

VOTER TERMINAL STORAGE AND TRANSPORT CART

CROSS-REFERENCE TO RELATED APPLICATION(S)

The present application is continuation-in-part of application Ser. No. 11/899,333 filed Sep. 5, 2007 now U.S. Pat. No. 7,654,457.

BACKGROUND

1. Field of Invention

The invention relates to accessories for voting terminals and, more particularly, to a specially-adapted voter cart for storage, transport, and use of a voting terminal in a more convenient and secure manner.

2. Background of the Invention

There are a myriad of existing storage and transport carts currently in use for a wide variety of applications. Some of these carts are adapted for carrying high-value electronic equipment, while others carry confidential high-security items. Voter carts for voting devices must combine both sets of attributes inasmuch as voting devices are high-value devices and require considerable security precautions. Moreover, voting devices can be heavy, thus requiring a very robust voter cart, but they must be thoroughly accessible by all persons, inclusive of physically disabled persons, from outside the cart.

Most polling precincts in the United States utilize voting booths with specialized balloting terminals. In the past, many precincts used terminals such as Datavote™ or Votomatic™, which required the voter to punch out a perforated rectangle (i.e., a chad) from a card using a stylus. There is a mask installed in the Votomatic™ that reveals certain holes that are aligned with ballot book pages in the recorder and which in turn correspond to names of candidates or issues. The punched card is then taken and inserted into a precinct ballot counter that is programmed to translate the hole and number to the particular candidate or issue.

Paper balloting can be hard to use for mobility impaired, vision impaired, and non-English speaking voters. Consequently, electronic balloting terminals are gaining popularity, and at least one or two are made available in each voting precinct. Indeed, the Help America Vote Act of 2002 has mandated that, beginning in 2006, each polling place have at least one voting machine that is fully accessible for persons with disabilities. Direct recording electronic (DRE) voting machines can fulfill this accessibility requirement. DRE voting machines typically entail a touch-screen ballot-marking machine with audio capability (usually via attached headphones). A DRE voting machine records votes, processes the data, and records voting data and ballot images in memory. After the election, the DRE voting machine produces a tabulation of the voting data stored in a removable memory component and as printed copy.

There are many manufacturers of DRE voting machines including Diebold Election Systems, ES&S, Sequoia Voting Systems, and Hart Intercivic. For example, the AutoMARK™ voter assist terminal by ES&S is a ballot-marking terminal sized at approximately 21"×26"×18" when a fold-out 15" full-color touch-screen display is deployed (and approximately 21"×26"×8" when the screen is not deployed). Voters securely cast their vote for each race or ballot proposition simply through the touch of the screen or by way of audio guidance. When the voter inserts the ballot into the AutoMARK™, an electronic version of the ballot appears on the screen and can be read electronically to the voter. Upon the voter's direction, the AutoMARK™ marks the ovals on the optical scan ballot. Whether using a DRE voting machine or any other optical scan voting terminal, the voter is provided with a completed paper ballot that will later be inserted into an optical scan ballot counter for tabulation, after which the paper ballot is deposited into a sealed ballot box.

Voting precincts typically employ six to twelve voting booths. Delivering, setting up, monitoring, tearing down, and returning to storage all the voting equipment is a cumbersome task. Most precincts now either manually carry and transport the equipment or use standard voter carts similar to those that carry folding chairs. These generic voter carts normally comprise a simple platform mounted on wheels or casters to provide mobility. These carts may be provided with upwardly protruding side-rails to constrain the equipment. Such carts take no security precautions and do not provide on-board access to the equipment for voting use. One of the main functions of the voting terminal cart is to provide a secure environment to prevent theft or tampering of the items stored within the cart. Ordinarily, the equipment for each voting booth—one ballot-marking/printing system and voting table—is loaded onto the voter cart, and is then wheeled into position for use. Because the equipment is not accessible while on the cart, it must be unloaded, and the cart is then removed for voting. After voting, the process is reversed.

A voter cart that houses the voting terminal in a fully operable and accessible position—the voting terminal being approximately waist-level for easy access by standing or wheelchair voters—would be much more convenient. To properly mount a ballot-marking voting terminal to cart, robust mechanical restraints to protect against shifting of the equipment, robust security features to protect against theft or tampering, and full front and back access to the voting terminal are needed.

SUMMARY OF THE INVENTION

It is, therefore, an object of the present invention to provide a storage and transport cart specifically adapted to allow operable access to a voting terminal such as the AutoMARK™.

It is another object to provide a voting cart with robust mechanical restraints to protect against shifting of the equipment and robust security features to protect against theft and tampering with the voting terminal.

It is another object to provide a voting cart that is light weight and as inexpensive to manufacture as possible (a lighter weight provides a higher degree of mobility, and thus it is desirable that the framework be as light weight as possible without sacrificing stability and security).

It is another object to provide a storage and transport cart as above that situates the voting terminal face-forward on a waist-level shelf for easy use and wheelchair voter access thereto, and to provide added security and protection to the voting terminal when in an un-deployed position.

It is another object to provide a storage and transport cart as above that affords complete privacy to a voter when using the voting terminal on the shelf.

It is another object to provide a storage and transport cart as above that affords complete access to the electronic access panel of the voting terminal when the unit is in either the stowed or deployed position.

It is another object to provide a storage and transport cart as above that includes lateral restraints for the voting terminal, and yet still allows full front and back access to the control and electrical panel of the voting terminal.

It is another object to provide a storage and transport cart as above that provides additional storage and transport of equipment and accessories required for voter precincts. Examples of required items are additional collapsible voting booths, extension cords, and handicap accessory kits (signs, door stops, specialty door knob, specialty pencils, magnifiers, and forms).

According to the present invention, the above-described and other objects are accomplished by providing a specially-adapted voter cart for storage and transport of a voting terminal in a more convenient and secure manner. The voter cart is capable of supporting a voting terminal for operational use while storing other equipment and accessories required by the voting precinct. The voting terminal is seated on an enclosed housing's main shelf, and the other voting equipment and accessories are located in either a tote box or a lower compartment. The cart may be wheeled to a usable position in the precinct, the housing is opened, any necessary equipment or accessories are removed, the voting terminal is plugged in, and the precinct is then ready for voting traffic. Once the housing is opened, the voting terminal is deployed face-forward at waist-level on the main shelf for easy access for any voter, including wheelchair voters.

The cart is generally formed with a pair of opposing side rails defined by contiguous tubing bent in a closed rectangular loop with a full-width horizontal reinforcing strut at approximately mid-height. The side rails are bounded together by a fixedly attached voting terminal housing, and by a lower storage compartment or, if the storage compartment is not included, horizontal struts attached near the back of the cart. The side rails are spaced far enough apart to allow a wheelchair to roll in between the side rails to allow access to the voting terminal. A vertical strut runs from the bottom of the side rail to the full-width horizontal strut to further reinforce the side rail. Four casters (with optional brake locks) are mounted beneath the bottom of the side-rails. A voting terminal housing is fixedly attached between the side rails. When not in use, the housing completely encloses, and thereby secures, the contents. The voting terminal rests upon the housing's bottom shelf. A pair of opposing Z brackets secures the voting terminal to the shelf. When the voting terminal is slid into place between the Z brackets, the terminal is laterally and vertically secured. The terminal housing's top panel is defined by a pivotally attached lid that opens to allow an unobstructed view of the voting terminal. When the cart is in a stowed or stored position, the lid cannot open. The housing's front is defined by two pivotally attached doors that open to allow front access to the voting terminal. Likewise, the housing's back is defined by two pivotally attached doors that open to allow rear access to the voting terminal and optional tote box and lower storage compartment. The tote box is slidably secured to the top of the housing by a pair of opposing Z brackets. This particular design maximizes usability, strength, and security.

BRIEF DESCRIPTION OF THE DRAWINGS

Additional aspects of the present invention will become evident upon reviewing the embodiments described in the specification and the claims taken in conjunction with the accompanying figures, wherein like numerals designate like elements, and wherein:

DETAILED DESCRIPTION OF THE PREFERRED EMBODIMENT

The present invention is a voter cart designed for storage, transport, and use of a voting terminal and for storage and transport of other voting equipment and accessories in a convenient, secure, and readily accessible manner, thereby creating a portable and mobile voting booth for more convenient deployment in any voting precinct.

The voter cart 10 will be described by way of an exemplary embodiment adapted for securing an AutoMARK™ voting terminal, though the cart is equally suited for other brands of balloting voting terminals.

Figure 1:
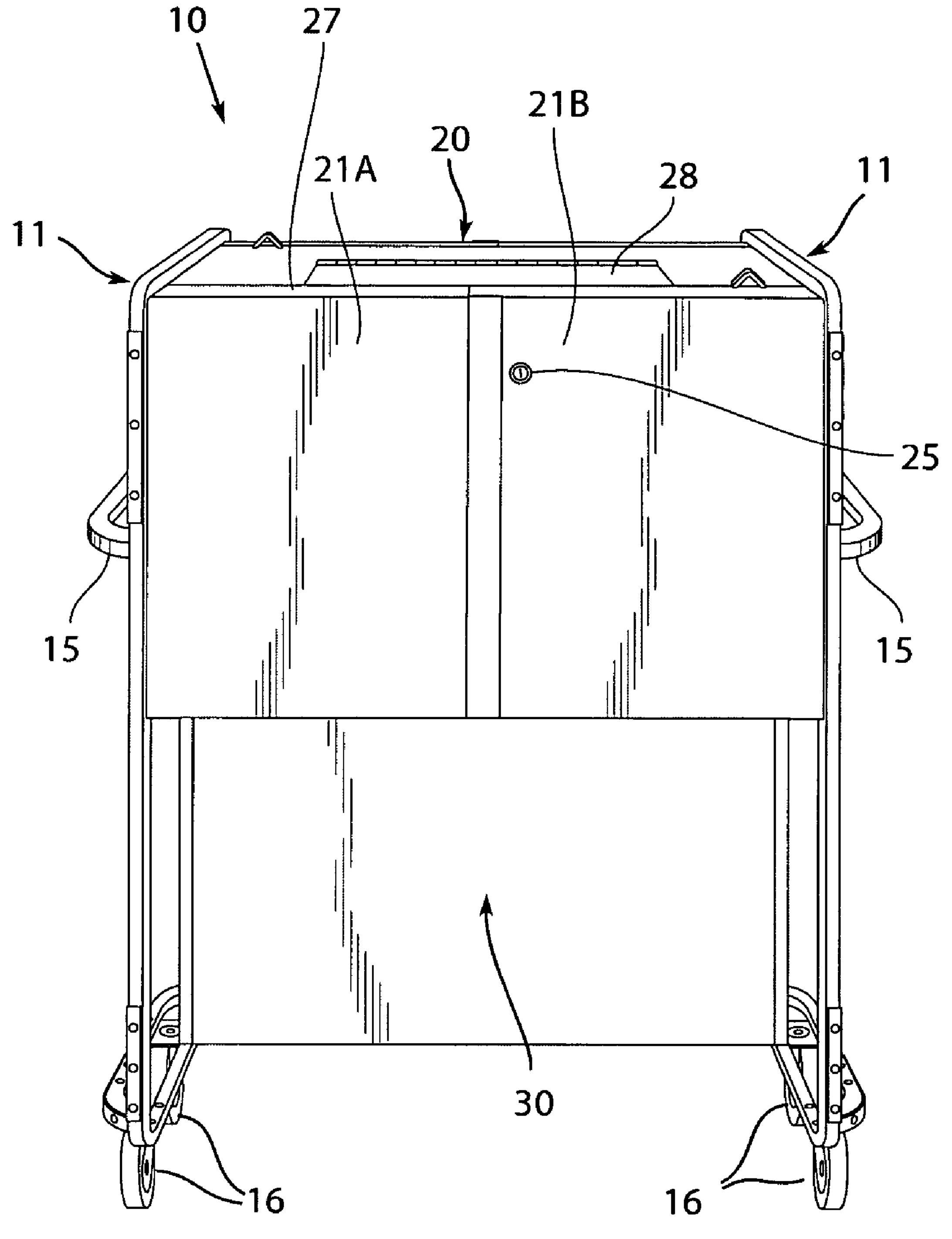
FIG. 1 is a front perspective view of voter cart 10 in a secured storage position.

FIG. 1 is a front perspective view of voter cart 10 according to an embodiment of the present invention. The voter cart 10 comprises an opposing pair of side-rail assemblies 11 between which a terminal housing 20 is interspaced. The side-rail assemblies 11 are bound together by the terminal housing 20 and the term "interspaced" as used herein shall be defined to mean being directly situated between the adjacent elements and binding such elements together. The side rail assemblies 11 are also bound together by an optional lower storage compartment 30 or horizontal struts (not shown) attached to the side rails at the same location as the optional compartment 30. As illustrated in FIG. 1, the voter cart 10 is in a storage position—the front doors 21A and 21B, back doors (see FIGS. 5-6), and top lid 28 are closed to completely enclose the contents of the terminal housing 20 and storage compartment 30. Thus, this position provides maximum security to the voting terminal and the housing's other contents when not in use. When closed, the front doors can be locked using the locking mechanism 25. Attached beneath the side-rail assemblies 11 is a plurality of casters 16. As illustrated, a pair of casters 16 is fixedly attached to each side-rail assembly 11. Additionally, a hand rail 15 is attached to each side-rail assembly 11.

Figure 2:
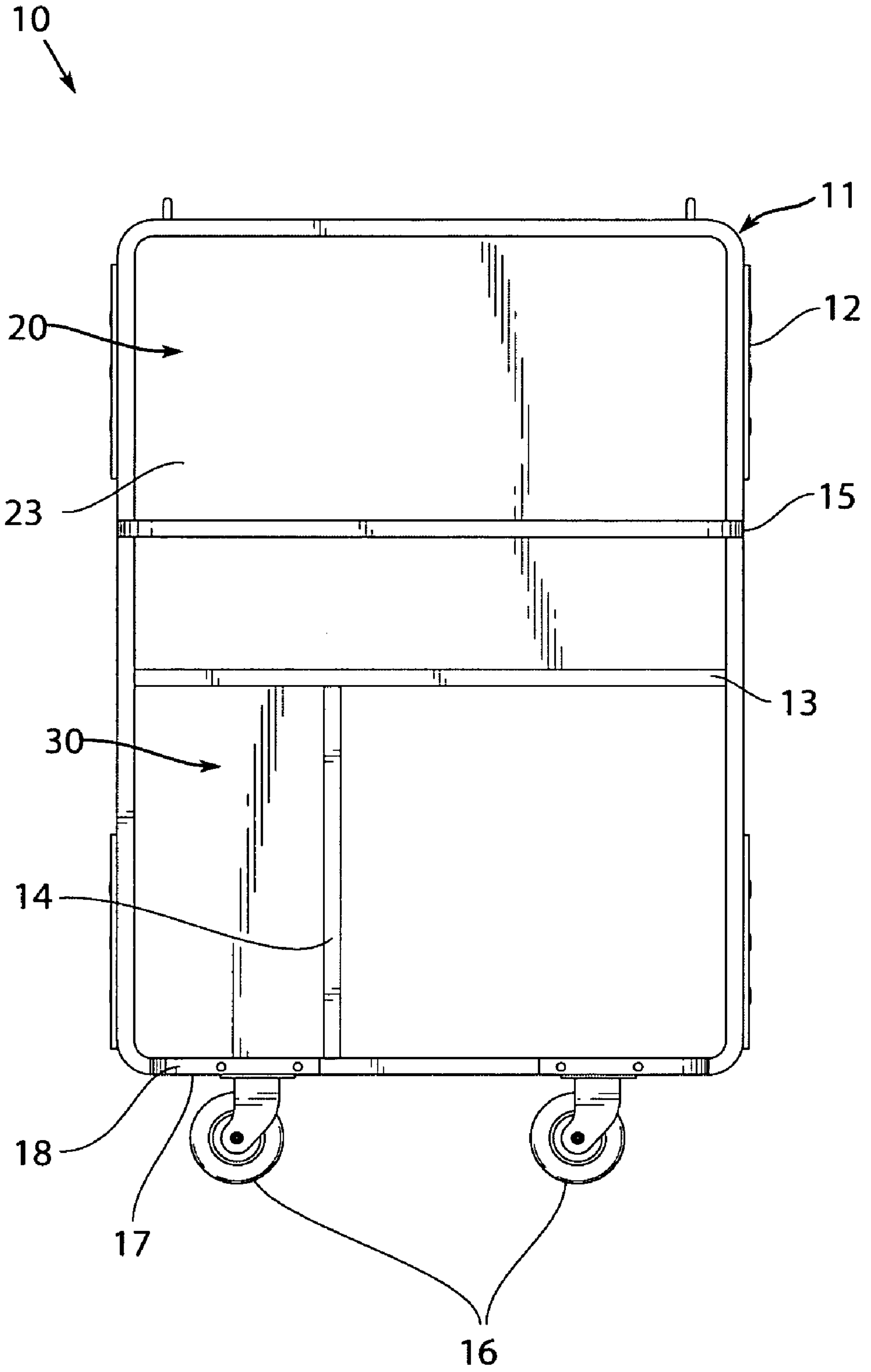
FIG. 2 is a left side view of the voter cart 10. The right side view of the voter cart 10 is a mirror image of FIG. 2.

FIG. 2 is a left side view of the voter cart 10 which better illustrates the framework, and the right side view of the voter cart 10 is a mirror image of FIG. 2. With collective reference to FIGS. 1-2, the cart 10 generally comprises a pair of opposing rectangular side-rail assemblies 11. The side-rail assemblies 11 are bounded together by the voting terminal housing 20 and the optional lower storage compartment 30. If the optional lower storage compartment 30 is omitted, the side-rail assemblies 11 may also be bounded together by at least one horizontal strut (not shown) attached in the rear. The side-rail assemblies 11 are spaced apart as to allow wheelchair access to the voting terminal. The side-rail assembly 11 may comprise a contiguous outer, rectangular loop of tubing, and the side-rail assembly 11 is further reinforced with a horizontal strut 13 at approximately mid-height of the side-rail assembly 11. A vertical strut 14 runs from the horizontal strut 13 to the bottom of the side rail 11.

Protruding from the upper-half of the side-rail assembly 11 is an elongated U-shaped handle 15. Handle 15 provides a safe and secure place to position hands to push or pull the voter cart 10. In an embodiment, each side-rail assembly 11 has a pair of mounted casters 16. The mounted casters can be mounted directly to the rectangular loop, or they can be mounted in combination with the rectangular loop and an elongated U-shaped caster mounting strut 17. The casters 16 may be locking casters for stability. An impact absorbing material 18, such as rubber or foam, may also line the outer periphery of the caster mounting strut 17 to minimize the force felt by the voting terminal upon a collision. Likewise, the front and back face of the rectangular loop may have impact absorbing material 12 to absorb the force from a collision. The framework for the above-described is preferably formed of powder-coated steel or aluminum square tubing.

Figure 3:
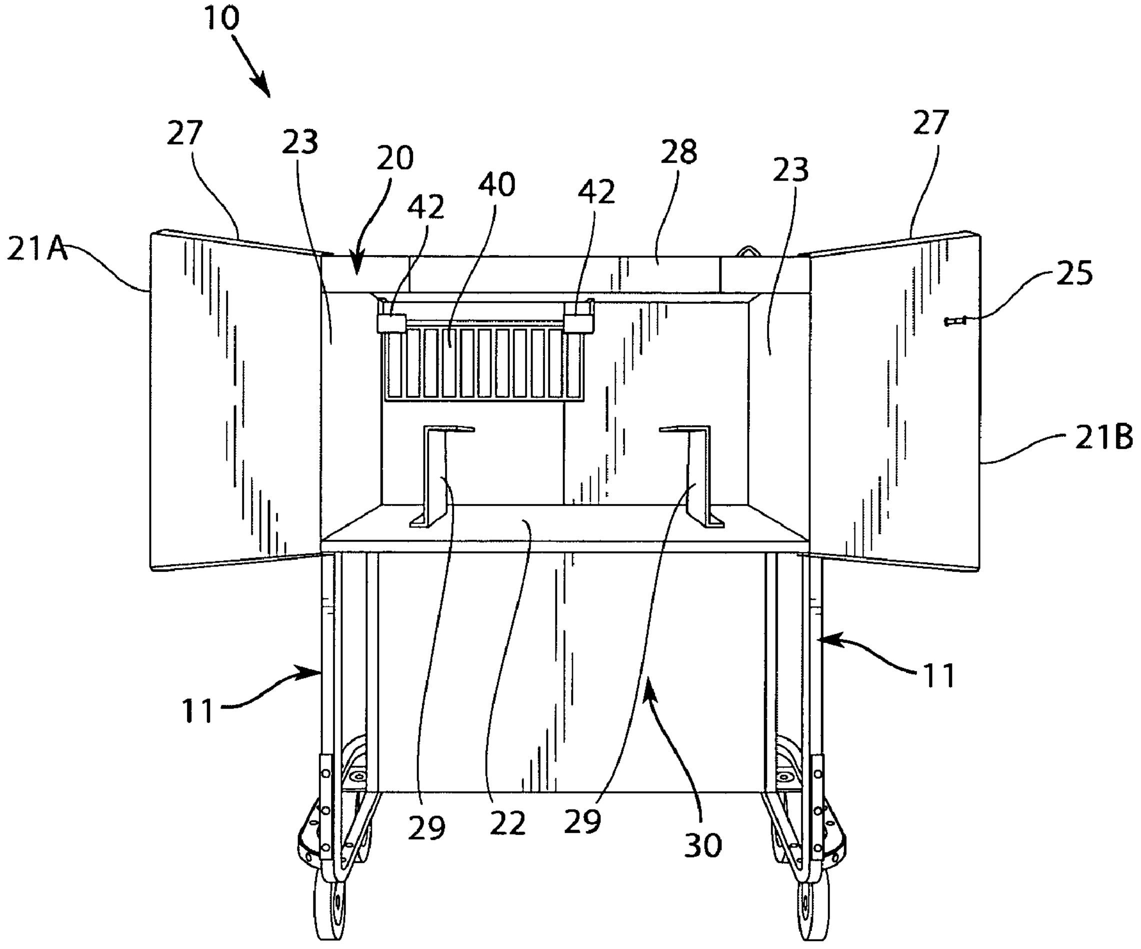
FIG. 3 is a front perspective view of voter cart 10 without a voting terminal and with the front doors opened.
Figure 4:
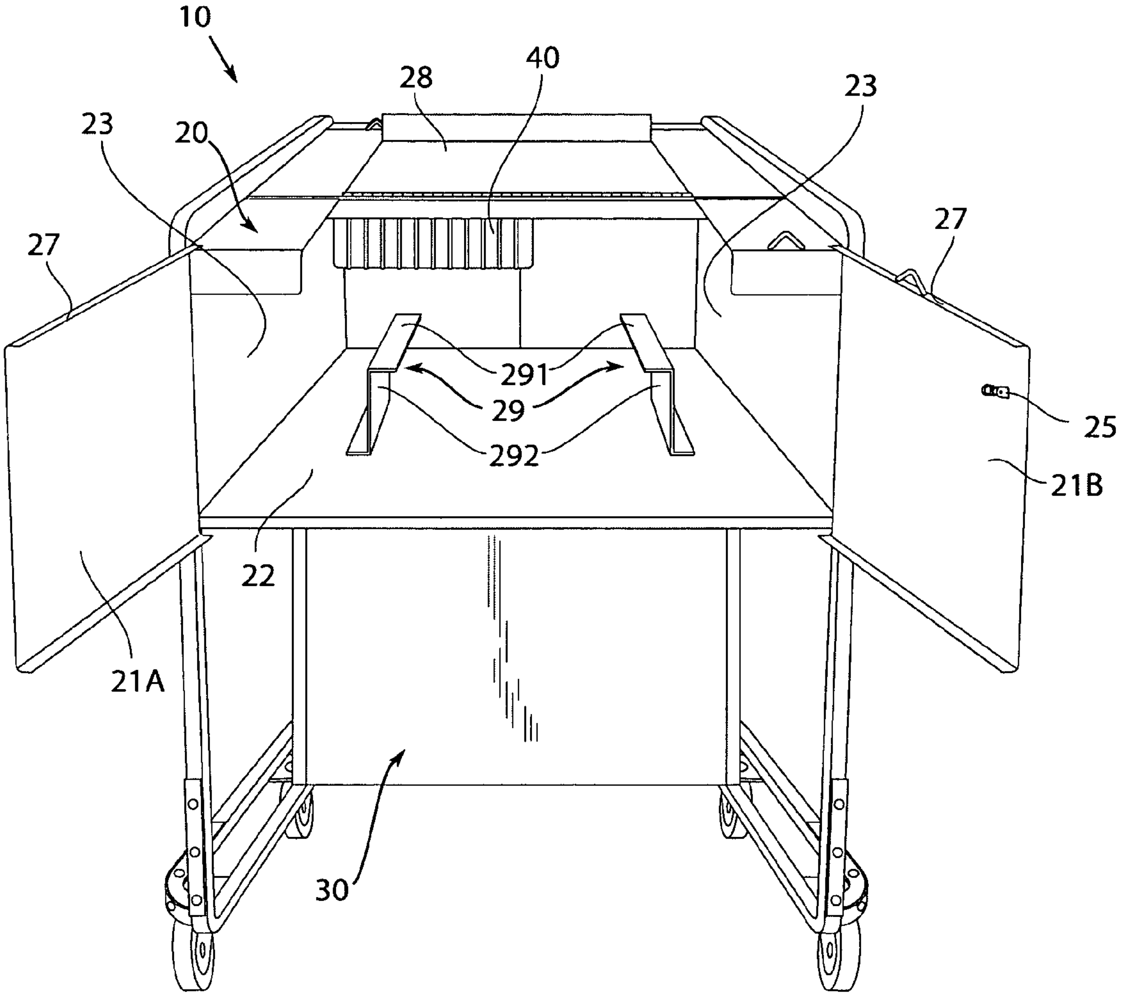
FIG. 4 is a top perspective view of the voter cart 10 with front doors and top lid opened.
Figure 5:
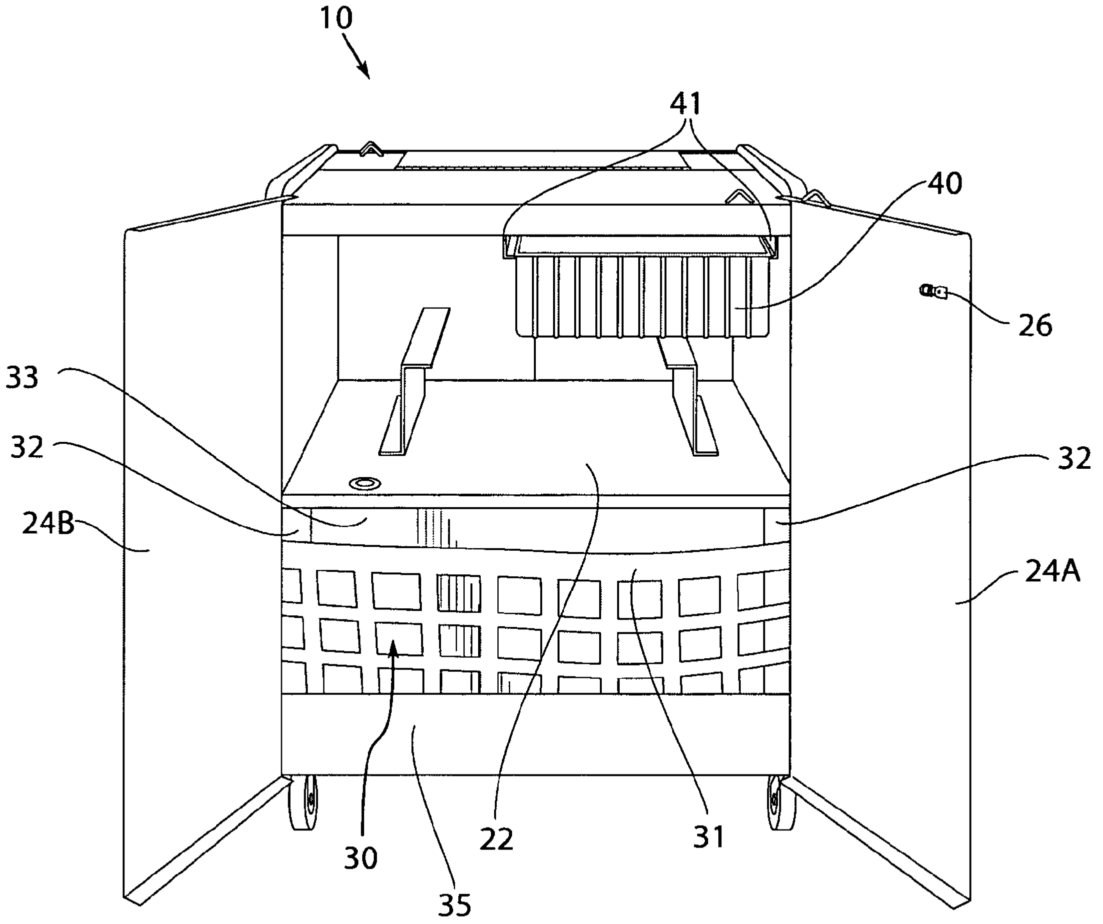
FIG. 5 is a back perspective view of voter cart 10 with back doors opened.
Figure 6:
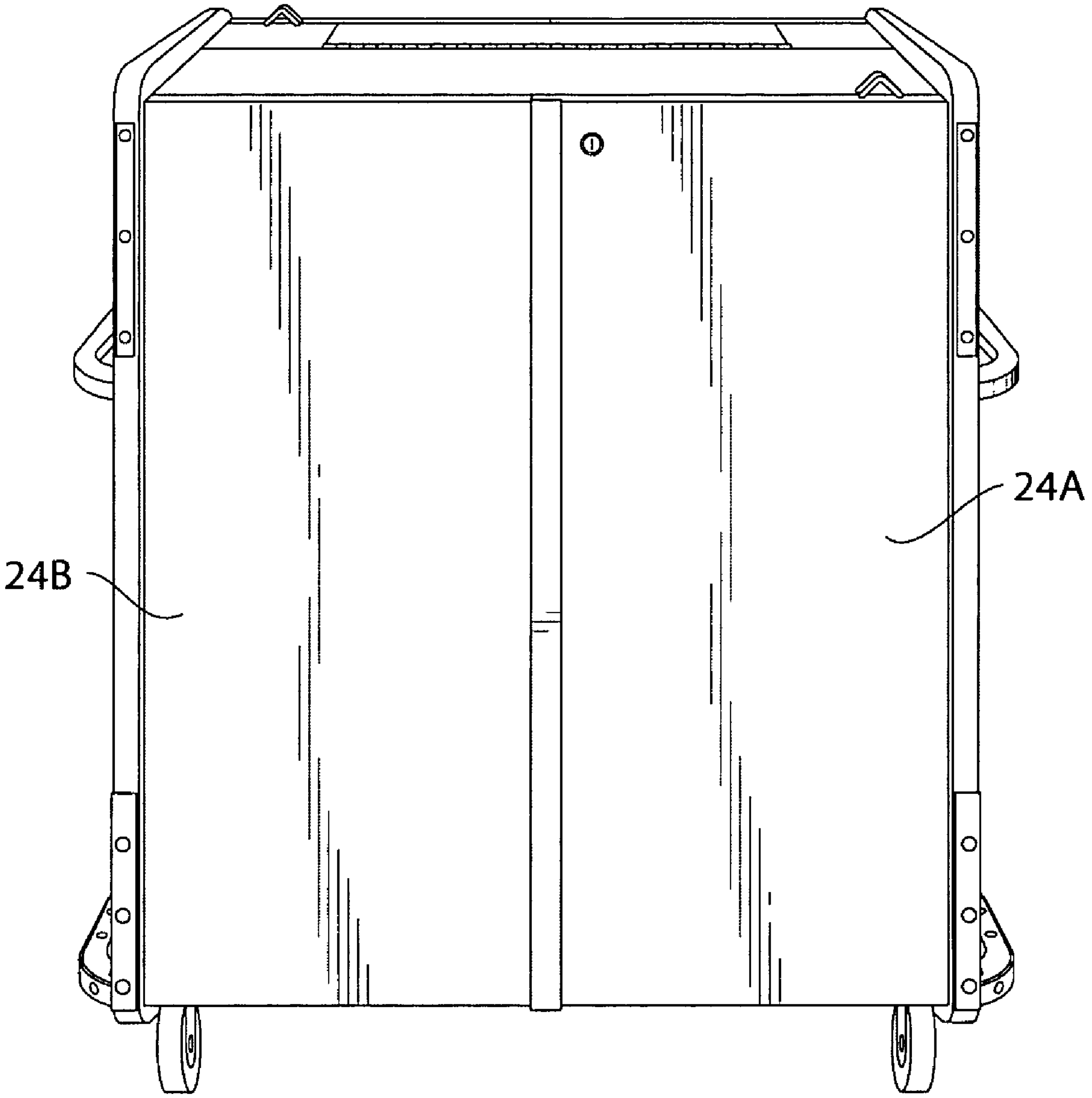
FIG. 6 is a back perspective view of voter cart 10 with the back doors closed.

FIG. 3 is a front perspective view and FIG. 4 is a top perspective view of voter cart 10 with the front doors 21A and 21B opened. FIG. 5 is a back perspective view of voter cart 10 with back doors 24A and 24B opened, and FIG. 6 is a back perspective view of voter cart 10 with the back doors closed. Referring collectively to FIGS. 3-6, side-rail assemblies 11 are bounded together by the voting terminal housing 20 and optional lower storage compartment 30. Terminal housing 20 and storage compartment 30 may be fixedly attached to the side-rail assemblies 11, for example, by welds or any type of fastener. The terminal housing 20 defines an interior space used to enclose a voting terminal. In a closed position, the housing 20 completely encloses the interior space thereby securing the housing's contents, and in the operational position, the interior space should be sufficient to accommodate the deployment of the voting terminal for voting use without removing the terminal from the housing.

In an embodiment, the housing 20 comprises a pair of side panels 23 fixedly attached to the side-rail assemblies 11 and the adjacent housing panels. These side panels 23 provide voter privacy when the terminal is being used. In the front, the housing 20 is further defined by a pair of doors 21A and 21B and, in the back, by a pair of doors 24A and 24B (FIGS. 5-6). Both pairs of doors are pivotally attached by means of a hinge or similar device. When the doors are closed, one door overlaps the other to prevent them from opening when the locking mechanisms 25 and 26 are engaged. The locking mechanisms can be any known method of securing doors including, but not limited to, cam locks, dead bolts, and combination locks. The housing 20 is further defined by a fixedly attached top panel having a pivotally attached lid 28. The lid 28 is attached by means of a hinge or similar mechanism. When lid 28 and the front doors 21A and 21B are closed, flanges 27 that run along the doors' top edges overlap the lid 28 to prevent the lid from opening. The housing 20 further comprises a fixedly attached bottom shelf 22 that supports the voting terminal. The shelf 22 and thereby the voting terminal are positioned at approximately waist level for convenient access for both sitting patrons (such as wheelchair voters) and standing patrons. The shelf 22 may also have an aperture allowing easy passage of electrical cords from the housing 20 to the lower compartment 30.

For additional security, the housing 20 may comprise a pair of triangular members. One triangular member is mounted on the flange 27 of a door. The other corresponding triangular member is mounted on the top panel of the housing. When the front door is closed, the triangular members are aligned and are in close proximity to each other. At this position, a lock or zip-tie may be fastened around both members thereby securing the door to the top panel, preventing the door from opening. Although these members are triangular in the illustrated embodiment, they may be any shape having an aperture or creating an aperture between the member and the top panel or door.

Referring to FIG. 4, the shelf 22 also comprises a mounting mechanism for securing the voting terminal. In the illustrated embodiment, the mounting mechanism is a pair of opposing Z brackets 29. The Z brackets 29 may be attached by a weld or with fasteners. The distance between the horizontal members 291 of the Z brackets 29 and the shelf 22 is slightly greater than the height of the voting terminal as to allow insertion of the voting terminal while also substantially preventing up-and-down movement. Likewise, the distance between the vertical members 292 of the brackets 29 is slightly greater than the width of the voting terminal as to allow insertion of the voting terminal while also substantially preventing left-and-right movement. For purposes of this application, to secure an object to a surface shall mean to affix the object to the surface in a manner than substantially prevents both side-to-side lateral motion and up-and-down vertical motion. The depth and shape of the bracket can be adapted to fit any voting terminal. The brackets should not interfere with the deployment of the voting terminal. This bracket configuration allows clear access to the front and rear electronic panels, internal memory chips, and data ports behind the voting terminal without removing the voting terminal from cart 10. This makes retrieval of the memory chips and other electrical connections much easier. Other mounting mechanisms such as straps and adhesives can secure the voting terminal to the shelf 22.

Referring specifically to FIG. 5, a tote box 40 may be slideably attached to the top of housing 20 by another pair of opposing brackets 41. In an embodiment, the brackets are Z brackets. The brackets 41 are attached underneath the top panel of the housing 20 by a weld or with fasteners. From the back side of the housing 20, a flange encircling the outer edge of tote box 40 is inserted between the brackets 41. Over insertion past the brackets is prevented by a pair of tabs 42 attached to the back of the brackets 41 (the front side of the cart). The tote box 40 may comprise plastic, metal, or any other rigid material.

FIG. 5 best illustrates lower storage compartment 30. Shelf 22 defines the top of lower compartment 30. Lower compartment 30 further comprises a fixedly attached pair of side panels 32, a bottom panel (not shown), a back panel 33 (front of cart), and a front panel 35 (back of cart) that partially extends upward from the bottom panel as to allow insertion of voting equipment into the compartment 30. Additional voting equipment may include collapsible voting booths, extension cords, and handicap accessory kits (signs, door stops, specialty door knob, specialty pencils, magnifiers, and forms). The lower compartment 30 is completely enclosed when back doors 24A and 24B are closed. When back doors 24A and 24B are opened, a retaining mesh 31 may be used to further secure the equipment. The mesh 31 is selectively attachable by locking clasp, buckle, snap, or other similar mechanism.

The walls, panels, and doors are preferably formed of powder coated steel or aluminum paneling. In the preferred embodiment, the housing 20 and compartment 30 are the only components used to space the side-rail assemblies 11 apart-horizontal tubing struts are not used in combination with the housing 20 or compartment 30. In an embodiment, the back panel 33 of the lower compartment 30 serves as a shear wall that resists lateral side-to-side loads placed on the cart. To further strengthen and to prevent buckling under force, the edges of the panels are bent ninety degrees. This configuration makes the cart as light weight as possible by eliminating the need for additional struts.

Figure 7:
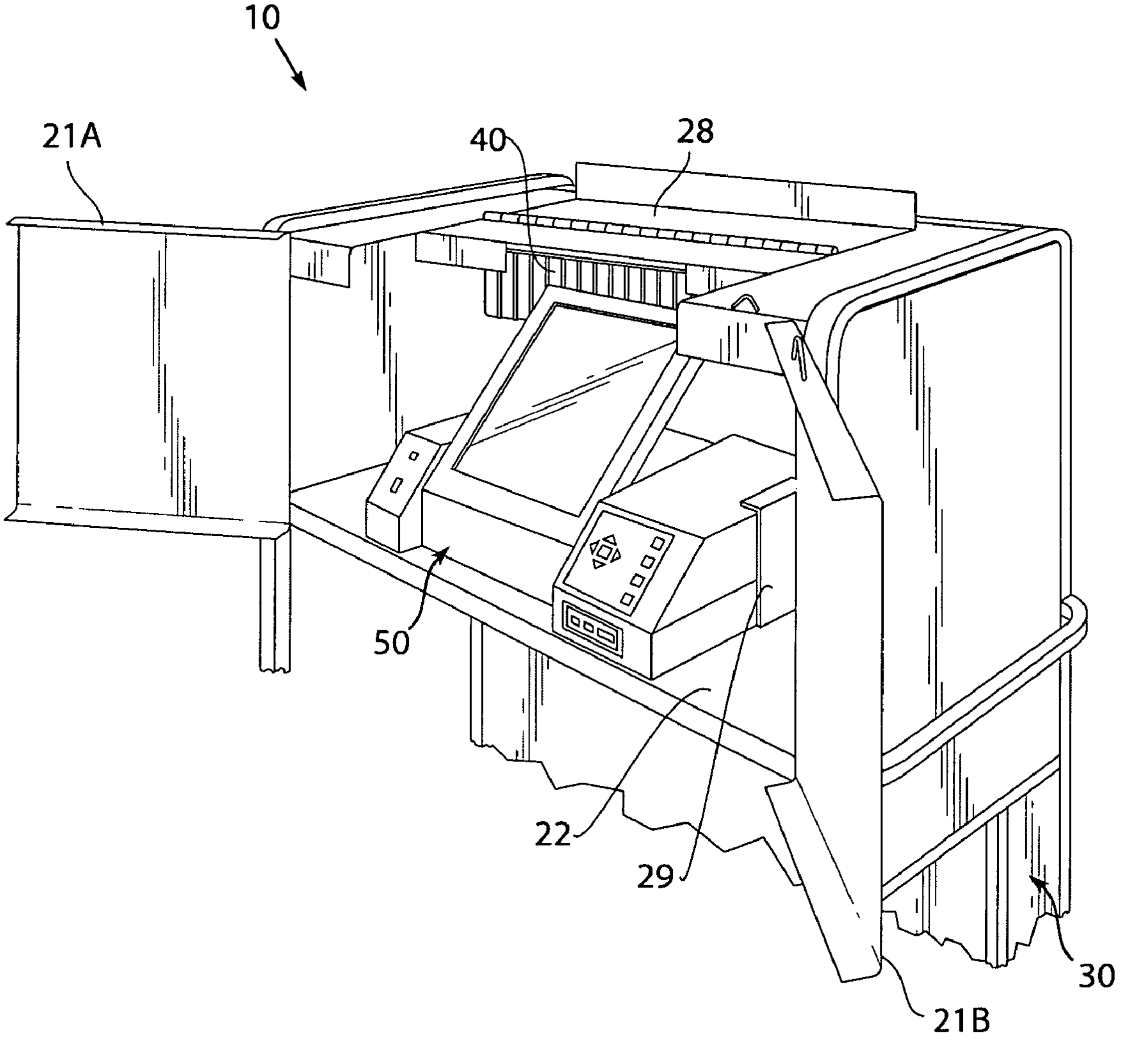
FIG. 7 is side perspective view of the voter cart 10 with voting terminal in use.

Referring to FIG. 7, in use, the voting terminal 50 is seated on shelf 22 and secured to the shelf by brackets 29. Additional voting equipment and accessories can be stored in the tote box 40 or lower compartment 30. The equipment, including the voting terminal, can remain on the cart 10 and need never be offloaded. When it is time to vote, the cart 10 is wheeled into a usable position at the precinct, and the front doors 21A and 21B and lid 28 are opened. And when the voting terminal 50 is plugged in, the precinct is then ready for voting traffic. Because the voting terminal is deployed at waist-level, it is easily accessible to wheelchair voters as well as standing voters. And because the equipment is fully accessible while on the cart 10, it need not be off-loaded for voting. During voting, the voting terminal 50 is fully restrained against side-to-side motion, and yet there is full access to the control panels and consoles of the voting terminal. Moreover, the particular design maximizes strength and usability, and yet keeps weight to a minimum with a framework that is as light weight as possible. After voting, the process is reversed and the cart 10 is removed without precinct workers lifting any equipment.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

We claim:

1. A voter cart for storing, transporting, and using a voting terminal that maintains the voting terminal in a fully operable and accessible position, comprising:

- a pair of opposing side rails comprised of one or more tubular members arranged in a substantially rectangular shape, said side rails being parallelly-disposed in a spaced relation for unobstructed access by a wheelchair there between;
- a plurality of casters mounted underneath a lowermost tubular member of each of the side rails;
- a voting terminal housing interspaced between the side rails that selectively and completely encloses the voting terminal for storage and transport and selectively opens to allow voter access when in use, said voting terminal housing comprising a bottom shelf suspended between said opposing side rails at approximately standing-waist height for supporting the voting terminal overtop a wheelchair there beneath, and an attachment mechanism that secures the voting terminal to said bottom shelf of the voting terminal housing while still allowing front and back access to the voting terminal;
- a pair of side panels fixedly attached to the side rails;
- a bottom panel fixedly attached to the side rails;
- a pair of doors pivotally attached to the front of the voting terminal housing that allows front access to the housing when opened, and the doors have a locking mechanism that selectively prevents the doors from opening when closed;
- a pair of doors pivotally attached to the back of the voting terminal housing that allows rear access to the housing when opened, and the doors have a locking mechanism that selectively prevents the doors from opening when closed;
- a top panel fixedly attached to the side rails having a lid pivotally attached that allows an unobstructed view of the voting terminal when in use;
- wherein the pair of doors attached to the front both have a flange running along their entire top edge that overlaps the lid when the doors and lid are closed, thereby preventing the lid from opening.

2. The voter cart for storing, transporting, and using a voting terminal of claim 1, wherein the attachment mechanism that secures the voting terminal to the shelf comprises a pair of opposing brackets mounted to the shelf that allow insertion of the voting terminal while substantially preventing lateral and vertical movement.

3. The voter cart for storing, transporting, and using a voting terminal of claim 2, wherein the brackets are Z brackets.

4. The voter cart for storing, transporting, and using a voting terminal of claim 1, wherein the attachment mechanism that secures the voting terminal to the shelf comprises a strap attached to the shelf that selectively fastens around the voting terminal thereby securing the voting terminal to the shelf, substantially preventing lateral and vertical movement.

5. The voter cart for storing, transporting, and using a voting terminal of claim 1, wherein the voting terminal housing further comprises a tote box that is slideably attached to the top of the housing by a pair of opposing brackets.

6. The voter cart for storing, transporting, and using a voting terminal of claim 5, wherein the brackets are Z brackets.

7. The voter cart for storing, transporting, and using a voting terminal of claim 1, wherein the cart further comprises a lower storage compartment interspaced between the side rails, and the lower storage compartment comprises a back panel, a pair of side panels, bottom panel, and a front panel that extends partially up towards the bottom of said shelf, and the pair of doors attached to the back encloses the lower compartment when closed.

8. The voter cart for storing, transporting, and using a voting terminal of claim 7, wherein the lower storage compartment further comprises a retainer mesh that selectively attaches to the outer edges of the lower storage compartment.

9. The voter cart for storing, transporting, and using a voting terminal of claim 1, further comprising a plurality of horizontal struts interspaced between the side rails below the voting terminal housing.

10. A voter cart for storing, transporting, and using a voting terminal that maintains the voting terminal in a fully operable and accessible position, comprising:

- a pair of opposing side rails, each comprising one or more tubular members arranged in a substantially rectangular shape, said side rails being parallelly-disposed in a spaced relation for unobstructed access by a wheelchair there between,
  - an outer rectangular frame comprising a top, left, right, and bottom tubular rail,
  - a horizontal strut spanning from the left and right rails of the rectangular frame,
  - a vertical strut spanning from the horizontal strut and the bottom rail of the rectangular frame,
  - an elongated U-shaped member protruding outward from the bottom rail of the rectangular frame for mounting casters, and
  - an elongated U-shaped member protruding outward from the left and right rails of the rectangular frame for use as a handle;
- a plurality of casters mounted to the bottom face of the bottom rail of the rectangular frame and bottom face of the elongated U-shaped member protruding outward from the bottom rail of the rectangular frame;

a voting terminal housing interspaced between and fixedly attached to the side rails that selectively and completely encloses the voting terminal for storage and transport and selectively opens to allow voter access when in use, said voting terminal housing comprising a bottom shelf suspended between said opposing side rails for supporting the voting terminal at approximately standing-waist height overtop a wheelchair there beneath, a pair of side panels fixedly attached to the side rails, a bottom panel fixedly attached to the side rails, a pair of doors pivotally attached to the front of the voting terminal housing that allows front access to the housing when opened, and the doors have a locking mechanism that selectively prevents the doors from opening when closed, a pair of doors pivotally attached to the back of the voting terminal housing that allows rear access to the housing when opened, and the doors have a locking mechanism that selectively prevents the doors from opening when closed, a top panel fixedly attached to the side rails having a lid pivotally attached that allows an unobstructed view of the voting terminal when in use, and an attachment mechanism that secures the voting terminal to said bottom shelf of the voting terminal housing while still allowing front and back access to the voting terminal;

wherein the pair of doors attached to the front both have a flange running along their entire top edge that overlaps the lid when the doors and lid are closed, thereby preventing the lid from opening; and a lower storage compartment interspaced between the side rails, and the lower storage compartment comprises a back panel, a pair of side panels, a bottom panel suspended between said opposing side rails at approximately standing-waist height, and a front panel that extends partially up towards the bottom of said bottom shelf; and the pair of doors attached to the back encloses the lower compartment when closed.

11. The voter cart for storing, transporting, and using a voting terminal of claim 10, wherein the attachment mechanism that secures the voting terminal to the shelf comprises a pair of opposing brackets mounted to the shelf that allows insertion of the voting terminal while substantially preventing lateral and vertical movement.

12. The voter cart for storing, transporting, and using a voting terminal of claim 11, wherein the brackets are Z brackets.

13. The voter cart for storing, transporting, and using a voting terminal of claim 10, wherein the attachment mechanism that secures the voting terminal to the shelf comprises a strap attached to the shelf that selectively fastens around the voting terminal thereby securing the voting terminal to the shelf, substantially preventing lateral and vertical movement.

14. The voter cart for storing, transporting, and using a voting terminal of claim 10, wherein the voting terminal housing further comprises a tote box that is slideably attached to the top of the housing by a pair of opposing brackets.

15. The voter cart for storing, transporting, and using a voting terminal of claim 14, wherein the brackets are Z brackets.

16. The voter cart for storing, transporting, and using a voting terminal of claim 10, wherein the lower storage compartment further comprises a retainer mesh that selectively attaches to the outer boundaries of the lower storage compartment.

17. The voter cart for storing, transporting, and using a voting terminal of claim 10, wherein the opposing side rails are spaced apart at a distance wide enough to accommodate wheel chair access to the voting terminal.

* * * * *